United States Patent
Jöllerichs et al.

[11] Patent Number: 6,151,545
[45] Date of Patent: Nov. 21, 2000

[54] METHOD FOR SIGNAL PROCESSING IN A CONTROL SYSTEM OF MOTOR VEHICLES

[75] Inventors: Rainer Jöllerichs, Springe; Thomas Lenz, Laatzen; Helmut Pannbacker, Hemmingen; Henrich Riedemann, Hannover; Detlef Schmidt, Gehrden, all of Germany

[73] Assignee: WABCO GmbH, Hannover, Germany

[21] Appl. No.: 09/081,397

[22] Filed: May 19, 1998

[30] Foreign Application Priority Data

May 22, 1997 [DE] Germany ............ 197 21 433

[51] Int. Cl.$^7$ .................. B60T 7/12; G05D 1/00
[52] U.S. Cl. .................. 701/74; 701/90; 303/DIG. 7
[58] Field of Search ............ 701/82, 90, 71, 701/72, 74, 83, 91, 84, 75, 76, 92; 303/DIG. 7, 122.03

[56] References Cited

U.S. PATENT DOCUMENTS

| | | | |
|---|---|---|---|
| 5,024,285 | 6/1991 | Fujita | 701/83 |
| 5,140,524 | 8/1992 | Matsuda | 701/72 |
| 5,277,482 | 1/1994 | Beyer et al. | 701/74 |
| 5,299,131 | 3/1994 | Haas et al. | 701/91 |
| 5,544,950 | 8/1996 | Burg et al. | 303/DIG. 7 |
| 5,631,836 | 5/1997 | Poggenburg et al. | 701/71 |

FOREIGN PATENT DOCUMENTS

| | | |
|---|---|---|
| 41 14 047 A1 | 11/1992 | Germany . |
| 43 09 183 A1 | 9/1994 | Germany . |
| 40 16 668 C2 | 11/1994 | Germany . |
| 43 21 284 A1 | 2/1995 | Germany . |
| 44 29 242 A1 | 2/1995 | Germany . |
| 43 37 794 A1 | 5/1995 | Germany . |
| 44 05 801 A1 | 8/1995 | Germany . |
| 44 28 347 A1 | 2/1996 | Germany . |
| 44 44 408 A1 | 6/1996 | Germany . |
| 195 10 104 C1 | 8/1996 | Germany . |
| 38 32 023 C2 | 11/1996 | Germany . |
| 196 36 310 A1 | 3/1997 | Germany . |

*Primary Examiner*—Jacques H. Louis-Jacques
*Assistant Examiner*—Brian J. Broadhead
*Attorney, Agent, or Firm*—Proskauer Rose LLP

[57] ABSTRACT

A signal (S) has a value at every point in time. The values may change in time and may lie within or outside a predetermined basic value range (BVMIN, BVMAX). The signal (S) is processed so that control steps associated with the values of the signal (S) are carried out when certain values of the signal (S) occur outside the basic value range (BVMIN, BVMAX). It may then occur that the carrying out of the control steps may be triggered in an undesirable manner because of implausible values of the signal (S). Such an implausible signal behavior must be recognized rapidly and the undesirable effects of the implausible signal behavior must be decreased or totally prevented at an early moment. For this purpose a value of the signal (S) occurring with relative frequency is determined as a dominant value (DV) as well as a frequency value (FV), which indicates frequency of occurrence of values of the signal (S) situated in the vicinity of the dominant value (DV). The execution of the control steps associated with the given values of signal (S) is then in addition rendered dependent on the magnitude of the deviation of the dominant value (DV) from the basic value range (BVMIN, BVMAX) when the frequency value (FV) reaches at least a predetermined magnitude (F1, F2). A preferred area of application of the invention is electronic control and regulating systems in vehicles.

16 Claims, 6 Drawing Sheets

METHOD FOR SIGNAL PROCESSING IN A CONTROL SYSTEM OF MOTOR VEHICLES

FIELD OF THE INVENTION

The present invention relates to a method for signal processing in a closed loop control environment. In particular, the present invention relates to methods used in control systems of motor vehicles.

BACKGROUND OF THE INVENTION

Specific examples of motor vehicle control systems are ABS systems for preventing locking of the wheels of a motor vehicle during braking, and ASR (traction control) systems for regulating drive slip of the drive wheels of a vehicle during acceleration. In such systems usually a regulating procedure is installed wherein the rotational velocity values of the wheels obtained by rotational-velocity sensors are processed as signals (especially information signals). When certain differences between the signals occur, control steps are triggered in the control system by means of which regulation, undesirable critical travel conditions of the vehicles are avoided. Since a closed loop control environment is involved in this case, the execution of these control steps also has a (feedback) effect on the above-mentioned signals. For instance, in case of drive slip regulation, when a spinning wheel is detected, the braking system assigned to this wheel is actuated so that the spinning tendency of the wheel is reduced.

It may however occur that differences between the signals are produced which are not caused by undesirable, critical travel conditions and which therefore should not trigger the controls. Thus for example, tires of unequal sizes or tires with unequal degrees of wear cause unequal rotational velocity signals to be produced at the rotational-velocity sensors without any locking tendency or spinning of the wheel occurring.

In order to avoid an undesirable actuation of the controls due to the above-mentioned tire differences, DE 41 14 047 A1, for example proposes an electronic braking or starting control system for vehicles which, upon recognizing such differences, computes an adaptation of the rotational velocity signals to each other. For this, and over a certain period of time that is relatively long for reasons of safety, the deviations among the rotational velocity signals are observed and a decision is made upon evaluation of the observed signal courses, on whether a deviation has occurred due to inequalities in tires. In this case the deviant rotational velocity signal is adjusted in further operation of the system through computation to another, non-deviant, observed rotational velocity signal. No progression by degrees of this adjustment is used in view of the fact that the signals are adjusted to each other at least in part relatively quickly.

The technical problem described before as an example always occurs in a general form when a signal to be processed in a method for signal processing normally shows values which are within a certain value range, called the basic value range, and when the signal can exceptionally take on certain values outside the basic value range, causing special control steps to be carried out. In this case, the special control steps should however not be carried out due to an implausible deviation of thee signal from the basic value range which may be caused, e.g., by a faulty signal calibration or by inequalities in the tires in the example of an electronic braking or starting control system for vehicles.

It is therefore the object of the present invention to rapidly recognize an implausible deviation of the signal as described above from the basic value range and to reduce or entirely prevent the undesirable effect of this deviation at an early point in time.

In the explanations below a signal is the course in time of a variable magnitude which has an amplitude value at any given point in time. The amplitude value is called the value of the signal. In case of a discrete-time signal, the sequence of individual amplitude values is designated as the signal.

A preferred area of application of the invention is in the electronic control and regulating systems in vehicles. As can be seen in the examples given in the description, the invention can also be used advantageously in other areas.

SUMMARY OF THE INVENTION

According to the present invention, a method for signal processing includes the following steps:

a) determining the values of a first signal varying in time, b) locating those signal values both within and outside a predetermined basic value range, c) determining a dominant value for a signal value which occurs frequently, d) determining a frequency value for the frequency of occurrence of signals in the proximity of the dominant value, e) executing control steps when the first signal values fall outside the predetermined basic value range, while considering the dominant value and the frequency value, such that the execution of control steps is further dependent on the magnitude of deviation of the dominant value from the basic value range when the frequency value reaches at least a predetermined magnitude.

One advantage of the invention consists in the fact that frequency values make it possible to determine the probability of an implausible deviation of the first signal from the basic value range. The magnitude of the implausible deviation can be derived from the dominant value. A reduction of the undesirable effects can be carried out by means of this magnitude of the implausible deviation when a predetermined probability is reached.

In an advantageous further development of the invention, the first signal is utilized in a closed loop control environment. In this case the first signal can again be influenced due to the reaction of the closed loop control environment by carrying out certain process steps assigned to certain values of the first signal. This has the advantage that the first signal can be prevented from remaining for a long period of time within a certain value range. As a result, the invention is insensitive to erroneous identification of values as implausible which are actually plausible.

The invention can be used advantageously for the processing of continuous as well as discrete signals. In the case of signals which are continuous in time, the signal values are determined by sampling at given points in time. In case of discrete-time signals, the signal consists of a time sequence of individual values which can be utilized directly for the method according to the invention. If the method of the invention is carried out by a microprocessor, the continuous-value signals are converted into digital values suitable for the microprocessor, e.g., by means of an analog/digital converter. Otherwise the continuous-value signals can also be processed directly.

In an advantageous further development of the invention, time segments and value ranges are defined by means of which indications can be obtained easily on the distribution of the values of the first signal or of certain frequencies for the evaluation of the first signal. For this, the value range is then newly determined at the beginning of every time segment as a function of the actual value of the first signal which is used as a comparison value. In the subsequent consideration of the further values of the first signal, those time segments which have a predetermined duration in regular cases can also be terminated early if the value of the first signal changes considerably, i.e., if one of the values leaves the previously determined value range. Thereby, the method according to the invention can be utilized also advantageously in cases of dynamic signal courses. In case of a regular passing of a time segment, the comparison value represents an approximation for the values of the first signal occurring in this time segment.

In another advantageous further development of the invention, only the comparison values found in regularly terminated time segments are taken into consideration to determine the frequency value. In this case, a value range is again determined which in this case refers to a first comparison value taken into consideration and used as a preferred value. The frequency value is then found based on the number of considered comparison values within this value range. This makes it possible in an especially simple manner to determine the frequency value without costly storage of a large quantity of signal values from the past, so that the method according to the invention can be carried out with very little memory and computing effort. It is a further advantage that the invention can be adapted to a great variety of application areas and signal forms by determining suitable values for the length of the time segments and the magnitude of the value ranges.

In an advantageous further development of the invention, the previously described comparison value is used directly as the dominant value. Through this the process according to the invention can be very easily implemented and the memory requirements are kept low.

In another advantageous further development of the invention the comparison value is not used directly as the dominant value but is accepted as the dominant value when certain combinations of the frequency value and of internal status data of the method used for the control environment occur. Contrary to the previously mentioned further development of the invention, this further development can be used to special advantage when the tolerance limit of an implausible signal behavior depends on certain conditions internal to the control method being met, such as, e.g., the presence of a regulating intervention. By tying the internal status data to the frequency value, it is relatively simple to graduate the reaction to implausible signals. For example, a process step which might be felt as disturbing but which has no impact on safety, can be stopped at the occurrence of a low frequency value, while a process step which is relevant to safety would not be stopped until the occurrence of a greater frequency value which would indicate a higher probability of an implausible signal.

Certain values of the first signal outside the basic value range are assigned to control method steps which are carried out when these values occur. In an advantageous embodiment of the invention a threshold value is used for this, and when it is exceeded or not attained by the first signal, the execution of the process step is actuated. Depending on the application it must be determined whether it is the excess or the non-attainment of the threshold value which is to be used as the criterion for the execution of the control method steps. It is also possible to carry out one control method step in case of excess, and another control method step in case of non-attainment.

This further development makes it possible to reduce undesirable effects of an implausible signal behavior by means of computed adaptation of the values of the first signal or through adaptation of the threshold value, whereby either adaptation is made with the goal of increasing the distance between the first signal and the threshold value for compensation of the implausible signal behavior.

In a first advantageous embodiment of this further development, the values of the first signal are increasingly adapted through computation as the deviations of the dominant value from the basic value range are becoming greater. When an excess of the threshold value is taken as a criterion for the execution of the process steps, the values of the first signal are reduced. If, on the other hand, a non-attainment of the threshold value is taken as criterion for the execution of the process steps, the values of the first signal are expanded.

In a second advantageous embodiment of this further development, not the values of the signal, but the threshold value is adapted. The type of adaptation in this case also takes place while taking into account the criterion for the execution of the process steps, but in opposite manner to the adaptation of the values of the first signal.

A combination of these two embodiments of the invention is also advantageous.

In an advantageous further development of the invention, the frequency value is automatically increased when comparison values situated in the preference value range appear, and is decreased automatically in the contrary case, insofar as these are comparison values which are taken into account. Advantageously, in particular when using the invention in a digital, electronic system, a counter is used to determine the frequency value, the count representing the frequency value. Such counters can change their count, e.g., by counting impulses. When using a microprocessor to carry out the method according to the invention, a counting register in the microprocessor or in a memory module connected to same can be used as the counter.

As a criterion to change the count, a verification is made in every time segment to ascertain whether the comparison value determined in this time segment is located within or outside the preferred value range. This affords the advantage that the frequency value can be determined by simple means which are generally present in today's conventional devices to carry out similar methods.

In another advantageous further development of the invention, the preferred value is determined in a time segment in which the frequency value is at least approximately zero. Since a preferred value range defined on the basis of a first preferred value is used to determine the frequency value, and since furthermore the dominant value depends on the preferred value, this further development offers the advantage, on the one hand, that the data (frequency value and dominant value) needed together in order to carry out the method according to the invention correlate in time with each other, so that relevant data are available at any point in time. On the other hand, this further development has the additional advantage that in carrying out the method, a preferred value is determined not only one single time, e.g., after switching on the device to carry out the method according to the invention, but that in principle a preferred value can be determined at any point in time as a function of the values of the first signal.

In an advantageous further development of the invention, the first signal represents the difference between a second and a third signal. In particular, when using the process in a control or regulating arrangement in a motor vehicle, velocity signals which must be compared with each other within the framework of carrying out the method can be used as the second and third signal. It is especially advantageous here to determine the first signal as a slip signal representing for example the drive slip or braking slip of a wheel by comparison with the vehicle velocity. In this case, the first signal can be determined as an absolute difference or absolute slip value as the difference between the second and the third signal or as a relative difference or relative slip value as quotient thereof. Also, a combination of these embodiments of the invention is advantageous.

The invention is explained in further detail through two embodiments described below.

In the first embodiment, the method according to the invention is utilized in a regulating system of a motor vehicle. In the second embodiment, the invention utilized in a regulating system of a sailboat is described.

DETAILED DESCRIPTION OF THE INVENTION

Figure 1:
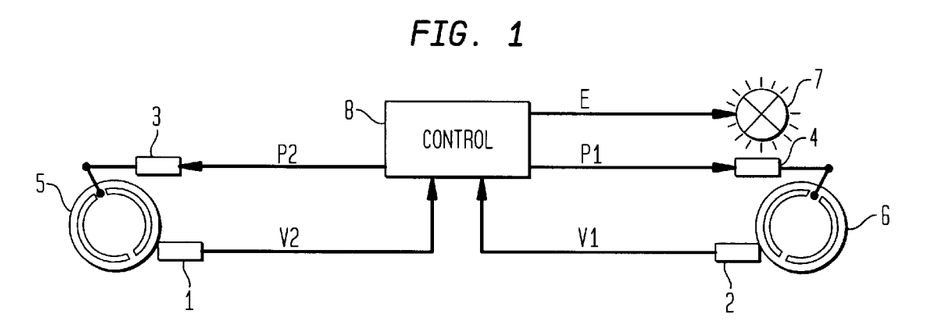
FIG. 1 is a block diagram of a device for the control of a drive and braking system of a vehicle.

FIG. 1 shows the components of a braking system of a vehicle which relate to the invention. Such a vehicle generally also has a drive system which consists, for example of an engine, a transmission and a drive shaft. In the embodiment according to FIG. 1, the drive system which is not shown is designed to drive a wheel (5). A wheel (6) on the other hand, is not driven. In the case of a truck with conventional drive arrangement, the wheel (5) is a rear wheel and the wheel (6) is a front wheel.

The wheels (5, 6) can be imparted braking forces through their associated braking systems (3, 4). Thereby, the vehicle can be braked. A pressure fluid such as oil or air can be used as the force-imparting medium. In the below example, the utilization of compressed air is assumed.

The illustrated brake systems consist in the conventional manner of compressed-air actuated drum or disk brakes which are actuated either through pneumatic pressure signals (P1, P2) or by electrical signals if an electronic brake system (EBS) is used. Depending on the type of brakes used, the braking systems (3, 4) may comprise mechanical, pneumatic or electronic components. The actuation signals (P1, P2) for the braking systems (3, 4) are produced in a control unit (8) which is preferably in the form of an electronic control unit comprising a microprocessor for carrying out a control program. The method according to the invention is then carried out as part of the control program.

Among other things, program segments which generate a brake slip regulation to avoid lockage of the wheels and drive slip regulation for the control of the drive wheel or wheels as a function of the rotational velocity signals of the wheels and possibly of a vehicle velocity signal, are control steps which are contained in the control program for suitable determination of the actuating signals (P1, P2). Furthermore, the control program may in addition contain an error recognition function for safety reasons, by means of which an error signal (E) is generated in case of errors in the brake system or in case of implausible input signals.

For this reason the installation according to FIG. 1 contains in addition an error display device (7) which is supplied the error signal (E) and which may be made in the form of a warning light, for example. To produce the rotational velocity signals of the wheels (5, 6), sensors (1, 2) which determine the rotational velocity are installed in proximity to the wheels and transmit rotational velocity signals (V2, V1) to the controls (8). The sensors (1, 2) may be made in a known manner in the form of electromagnetically acting impulse rpm indicators, each of which is associated with a toothed wheel which is connected to the corresponding wheel suspension of the wheels (5, 6).

The control unit (8) produces the actuating signals (P1, P2) as a function of the rotational velocity signals (V2, V1) in order to control the braking force on the braking systems (3, 4), and the error signal (E) to actuate the error display device (7).

Figure 2:
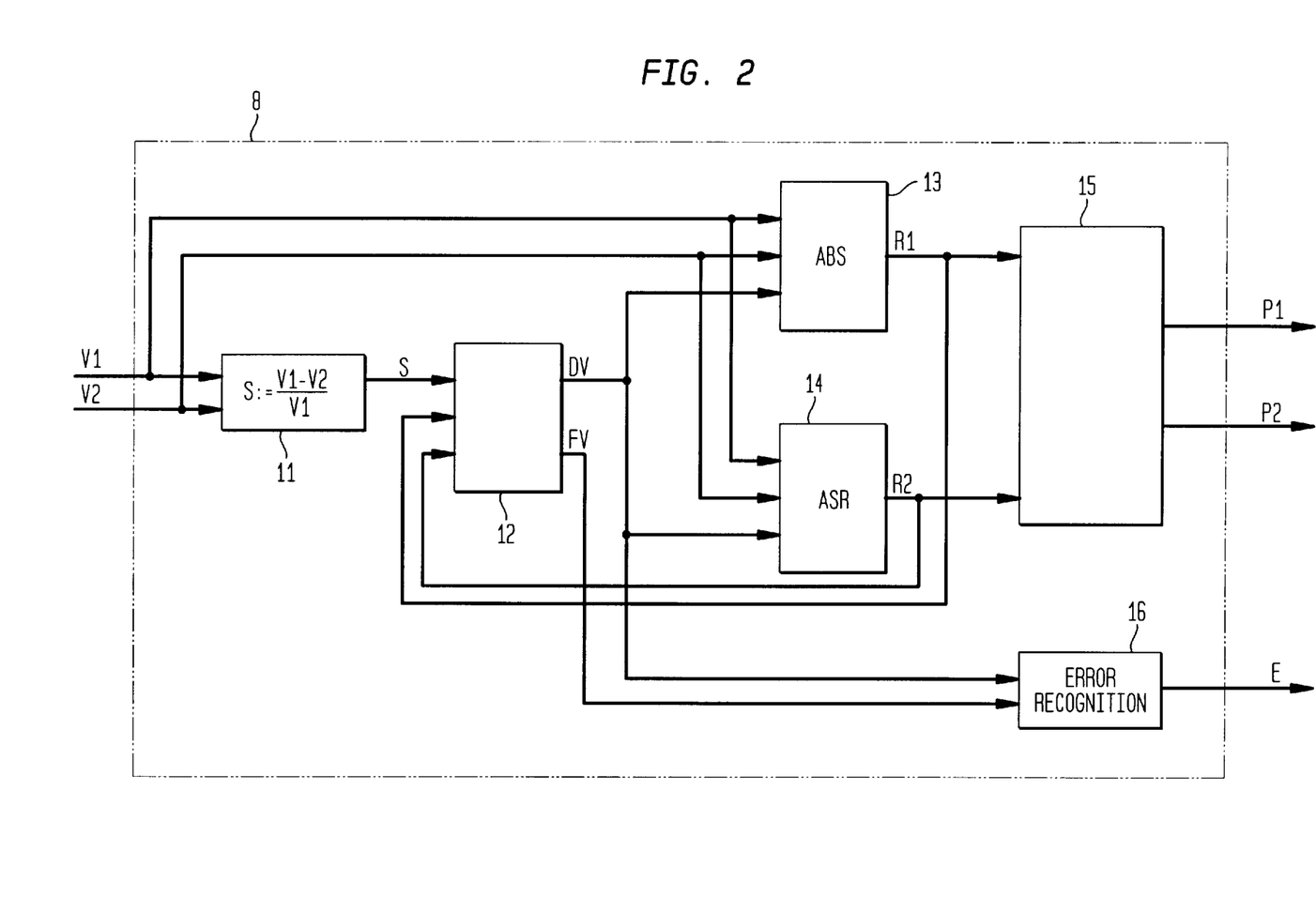
FIG. 2 shows an overview of the method according to the invention in the form of a diagram.

FIG. 2 shows a schematic diagram of the interaction of the program segments relating to the invention in the control unit (8). In FIG. 2, the function blocks (11, 12, 13, 14, 15, 16) represent different process segments or program segments of the control program for the microprocessor. In addition to the program segments shown there, the control program may contain yet other program segments, e.g., for error diagnostic or for velocity regulation of the vehicle. In the function blocks (11, 12, 13, 14, 15, 16) one or several output signals are produced by means of signal processing as a function of one or several input signals.

In block (11), a relative slip signal is calculated from the rotational velocity signals (V2, V1) by first forming the difference between the rotational velocity signals (V2, V1) and by then dividing this difference by one of the two rotational velocity signals (V1). The slip signal (S) thus has the approximate value zero in a frequently present operating state of the vehicle in which neither the brake slip nor the drive slip occurs and the sensors (1, 2) both supply plausible rotational velocity signals (V2, V1).

For various reasons, the value of the slip signal (S) may however deviate from the exact zero value without any drive or braking slip being present. The reasons for this may be manufacturing tolerances in the vehicle tires, unequal degrees of wear of the vehicle tires or different numbers of teeth in the toothed wheels which are connected to the sensors (1, 2) for interaction.

Certain minor deviations from the value zero which are produced only by admissible manufacturing tolerances of the vehicle tires, e.g., on the order of one percent, are tolerable. The range of tolerable values is defined as a basic value range (BVMIN, BVMAX) of the slip signal (S), whereby the slip signal (S) represents the first signal according to the invention.

Greater deviations of the slip signal (S) from the value zero may be based on implausible rotational velocity signals (V2, V1) which are caused by inadmissibly wide tire tolerances, e.g., different tire models, or by different numbers of teeth of the toothed wheels. The greater deviations of the slip signal (S) from the value zero may however also be caused by locking or spinning tendencies of the wheels (5, 6). In case of implausible rotational velocity signals (V2, V1) which result in turn in an implausible signal behavior of the slip signal (S), no undesirable braking or drive regulation should be carried out. On the other hand, a critical travel state must be absolutely avoided in case of a locking tendency or spinning of a wheel.

Block (12) is provided for the recognition of implausible signal behavior of the slip signal (S) and to distinguish between undesirable and desirable braking or drive slip regulation. As a function of the slip signal (S) and of additional signals (R1, R2) which represent internal status data of the method, a dominant value (DV) and a frequency value (FV) are produced in block (12) as output signals. The dominant value (DV) is a measure of the deviation of the slip signal (S) from value zero or, in general terms, from the middle of the basic value range. The frequency value (FV) indicates the frequency of the occurrence of values of the slip signal (S) located in the proximity of the dominant value and thus shows a probability with which the dominant value (DV) reliably indicates the deviation of the slip signal (S) from the basic value due to implausible rotational velocity signals (V1, V2).

The dominant value (DV) is supplied to the blocks (13, 14). In addition, the dominant value (DV) together with the frequency value (FV) are supplied to block (16) as input values. Block (16) serves for error recognition and produces in turn the error signal (E).

In block (13) a control output value (R1) is determined on the basis of the signal (DV) emitted by the block (12) as well as based on the rotational velocity signals (V2, V1) in such manner that locking of one or several wheels is avoided in the manner of an anti-lock braking system (ABS). In this embodiment, only the locking of the wheel (6) is considered for the sake of simplification. Of course the locking of the other wheels would also be avoided in practice. Then, additional rotational velocity signals may have to be supplied to the blocks (11, 13) as input signals.

In order to avoid very significant drive slip, an additional control output value (R2) is defined in block (14) for the purpose of drive slip regulation. Here the rotational velocity signals (V2, V1) as well as the dominant value (DV) are taken into account as input signals.

On the one hand, the control output values (R1, R2) determined in blocks (13, 14) are again transmitted to block (12). On the other hand, these signals, which are associated not with individual wheels of the vehicle but to the control functions of the control unit (8), are transmitted to a block (15) in which a determination of the actuating signals (P1, P2) associated with the wheels (5, 6) takes place. In this process, the braking force is normally reduced with brake slip regulation and a rapidly spinning wheel is again braked by increasing the braking force in a drive slip regulation. It is also possible to transmit the control output value (R2) to the drive system of the vehicle so that the spinning of the wheel may also be reduced by a reduction of the drive force.

Figure 3:
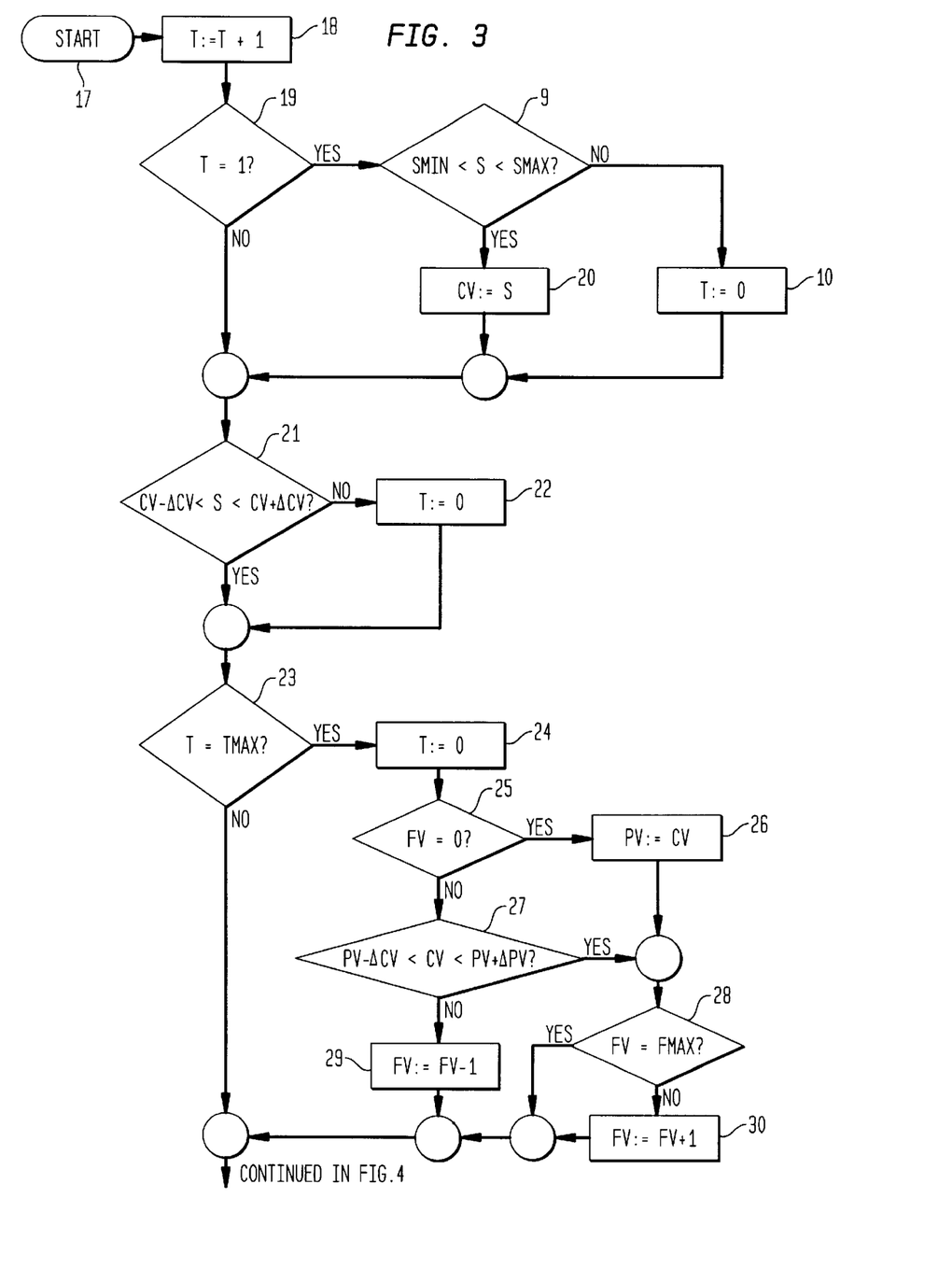
FIGS. 3 to 6 show representations of the method segments (12, 13, 14) of the method in the form of a flow chart.
Figure 4:
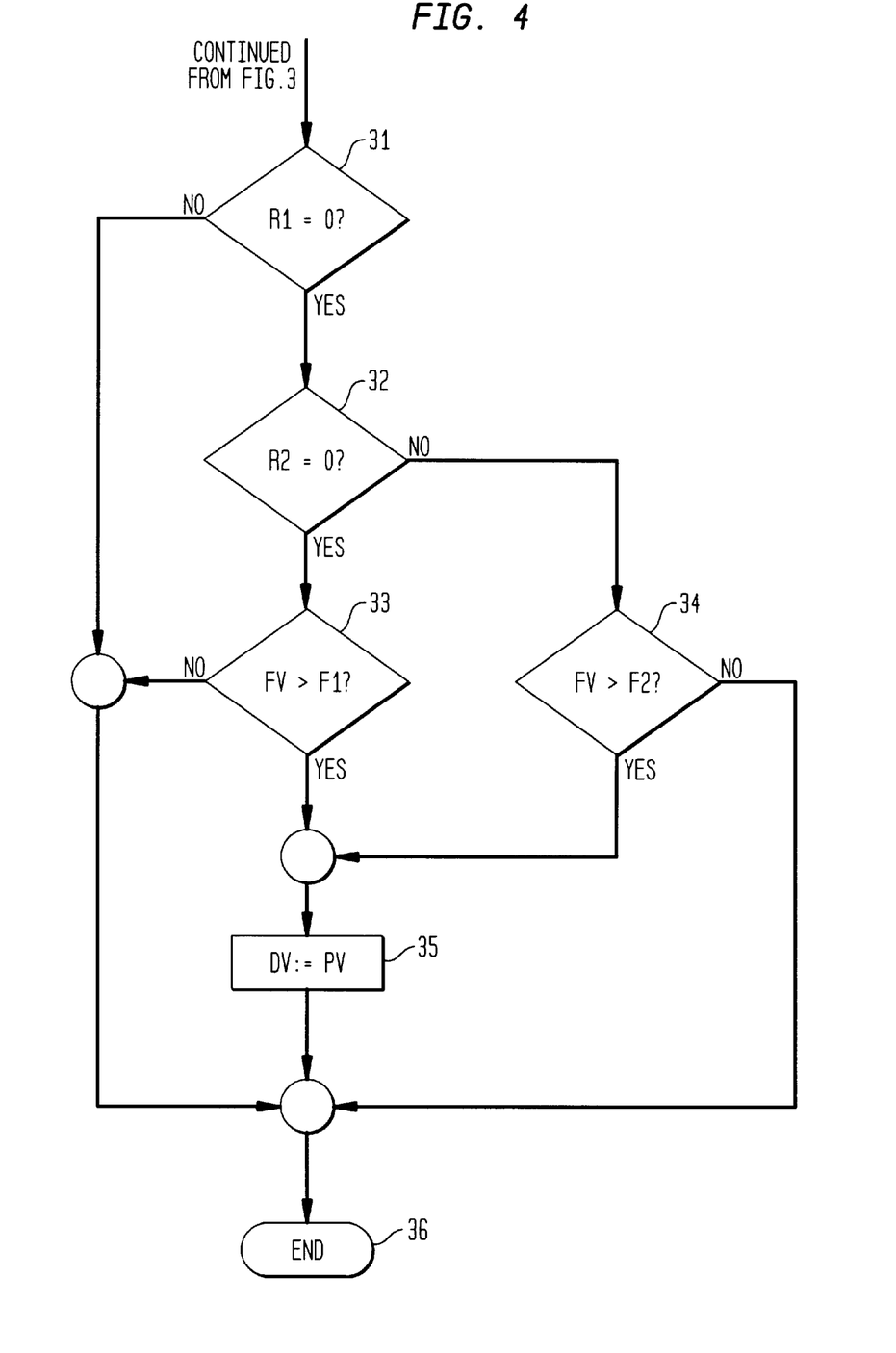

FIGS. 3 and 4 show the program segment contained in block (12) in form of a flow chart. The program segment starts in FIG. 3 with block (17). In the following processing block (18) a time counter (T) is incremented. The time counter serves to determine the time segments for the evaluation of the slip signal (S). After switching on the control unit (8), the time counter (T) first has the starting value zero. In the decision block (19) a verification is made to ascertain whether the current time segment is just starting. In this case the time counter (T) has the value 1. When the time segment is just starting, a verification is made in the decision block (9) whether the value of the slip signal (S) lies within an admissibility range set for this signal and extending from a lower value (SMIN) to an upper value (SMAX). If this is the case, the value (S) is accepted as a comparison value (CV) in the processing block (20). Otherwise the just started time segment is terminated early by resetting the time counter (T) to the value zero in the processing block (10). Suitable values for the determination of the admissibility range are, e.g., SMIN=−0.6 and SMAX=0.6.

In the decision block (21) a verification is then made to ascertain whether the value (S) is located within a certain range (−ΔCV, +ΔCV) in proximity of the comparison value (CV). If this is not the case, the time segment is terminated early in a processing block (22) by resetting the time counter (T) to its starting value zero.

In a decision block (23) a verification is made whether the regular end of the time segment has been reached. For this the time counter (T) is compared with a time constant (TMAX). A suitable value for TMAX is, e.g., 500 ms with repeated carrying out of the method according to the invention at time intervals of 5 ms. If the time segment is terminated regularly (T=TMAX), the time counter (T) is set back to its starting value zero in processing block (24).

A verification is then made in a decision block (25) to ascertain whether this is the end of the first regularly terminated time segment. In this case the frequency value (FV) has the value zero. The preferred value (PV) is then set to the comparison value (CV) in the processing block (26). Thereupon and following a verification of the frequency value (FV), the frequency value (FV) is incremented in the processing block (30) upon reaching a maximum value (FMAX) in the decision block (28) if the maximum value (FMAX) has not yet been reached.

If however the result of the verification in the decision block (25) is negative, a verification is conducted in another decision block (27) to ascertain whether the comparison value (CV) is located in a range (−ΔCV, +ΔCV) in proximity to the preferred value (PV). If the comparison value is in the preferred value range, the frequency value (FV) is also incremented in the blocks (28, 30). Otherwise the frequency value (FV) is decremented in the processing block (29). It is advantageous to select identical ranges (comparison value range and preferred value range) in the blocks (21, 27).

The program segment according to block (12) as described here is then continued in FIG. 4 with decision block (31).

Using the control output values (R1, R2) produced in the blocks (13, 14), a verification is then made in the decision blocks (31, 32) whether a control intervention of the control functions (ABS, ASR) is present. It is assumed here that in case of inactive control function, the control output values (R1, R2) have the value zero.

From the decision block (31) the program branches off directly to block (36) if a control intervention of the ABS function (R1≠0) is present, whereby this program segment ends. Independently of the then appearing frequency value (FV), the dominant value (DV) remains uninfluenced.

If no control intervention of the ABS function (R1=0) is present, the presence of a control intervention of the ASR function is checked in the decision block (32). Depending on the result of this check, the frequency value (FV) is checked in the decision blocks (33, 34) to ascertain whether certain limit values (F1, F2) have been exceeded. In this process, in case of no control intervention of the ASR function (R2=0), a relatively small limit value (F1) is used, and during the control intervention of the ASR function (R2≠0), a limit value (F2) which is greater by comparison is used. As a result, an undesirable actuation of the control can be avoided with relative reliability before a control intervention. An already running control intervention on the other hand, is not terminated suddenly.

When the corresponding limit value (F1, F2) is exceeded by the frequency value (FV), the dominant value (DV) is set to the preferred value (PV) in a processing block (35). This program segment then ends in block (36).

Figure 5:
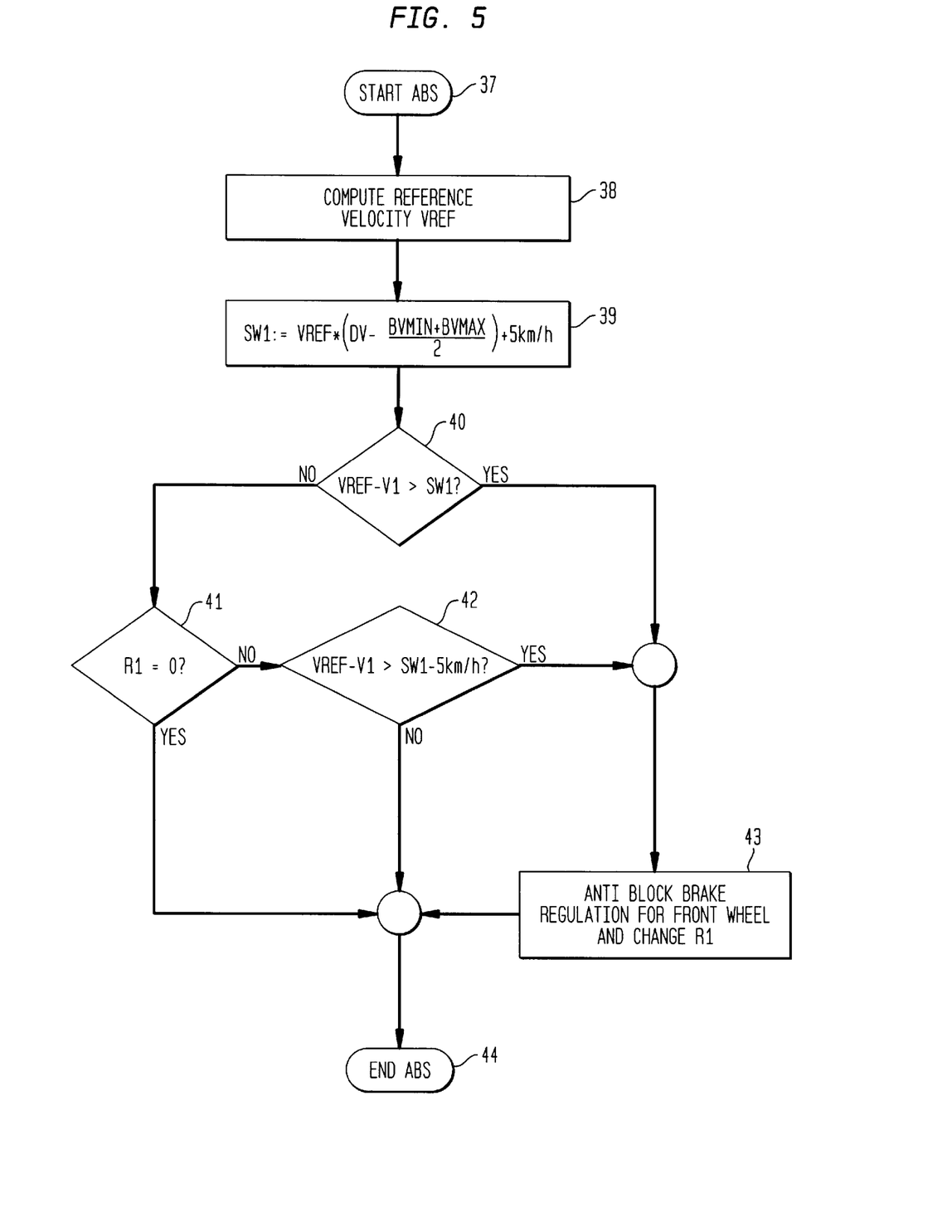

The utilization of the output signals of block (12) in the case of a brake slip control to avoid locking of the wheels (ABS) is shown in FIG. 5 in the form of a flow chart. For the sake of simplification only the control of the wheel (6) is considered here. This program segment is shown in FIG. 2 with block (13). It starts with block (37).

In a sub-program block (38), a so-called reference velocity (VREF) is determined. It represents the vehicle velocity and is used as an additional criterion to evaluate the necessity for a brake slip regulation. The computation of the reference velocity (VREF) can be carried out in a manner which is usual for anti-lock braking systems, as known, e.g., from DE 40 16 668 C2. In this case, at least the rotational velocity signals (V2, V1) and possibly also the rotational velocity signals of other wheels are taken into account for the computation. Possible implausibilities in these rotational velocity signals also therefore have an effect on the reference velocity (VREF).

Alternatively, it is also possible to use a vehicle velocity signal ascertained by a vehicle velocity sensor instead of the reference velocity.

In a processing block (39), a threshold value (SW1) is established to serve as a criterion for the need for brake slip regulation, e.g. because of the locking of a wheel. The threshold value (SW1) is here increased from a basic value (e.g., 5 km/h) in a linear manner by the deviation of the dominant value (DV) from the middle of the basic value range and by the frequency value (FV).

In a decision block (40), a verification is then made whether the rotational velocity signal (V1) has fallen below the reference limit velocity (VREF) to a greater extent than indicated by the threshold value (SW1). If this is the case, a brake slip regulation to maintain travel safety is required. This brake slip regulation is carried out in the sub-program block (43) and is not discussed here in further detail. Within the framework of brake slip regulation at least the initial value of the control output value (R1) is modified so that it may deviate from value zero. The brake slip regulation ends if the control output value (R1) should again reach its initial value zero.

If however the threshold value (SW1) is not exceeded in the decision block (40), a verification is made in a decision block (41) whether a brake slip regulation has already begun (R1≠0) or not (R1=0). In the latter case a verification analogous to the decision block (40) is conducted in the decision block (42), but with a reduced threshold value. If this reduced threshold value is exceeded, the program continues also with block (43). Through this utilization of a reduced threshold value, an already started brake slip regulation is not directly terminated again when the threshold value (SW1) is not attained in the decision block (40). The different threshold values in blocks (40, 42) thus represent a kind of hysteresis.

All the blocks (41, 42, 43) terminate into block (44) by which this program segment ends.

Figure 6:
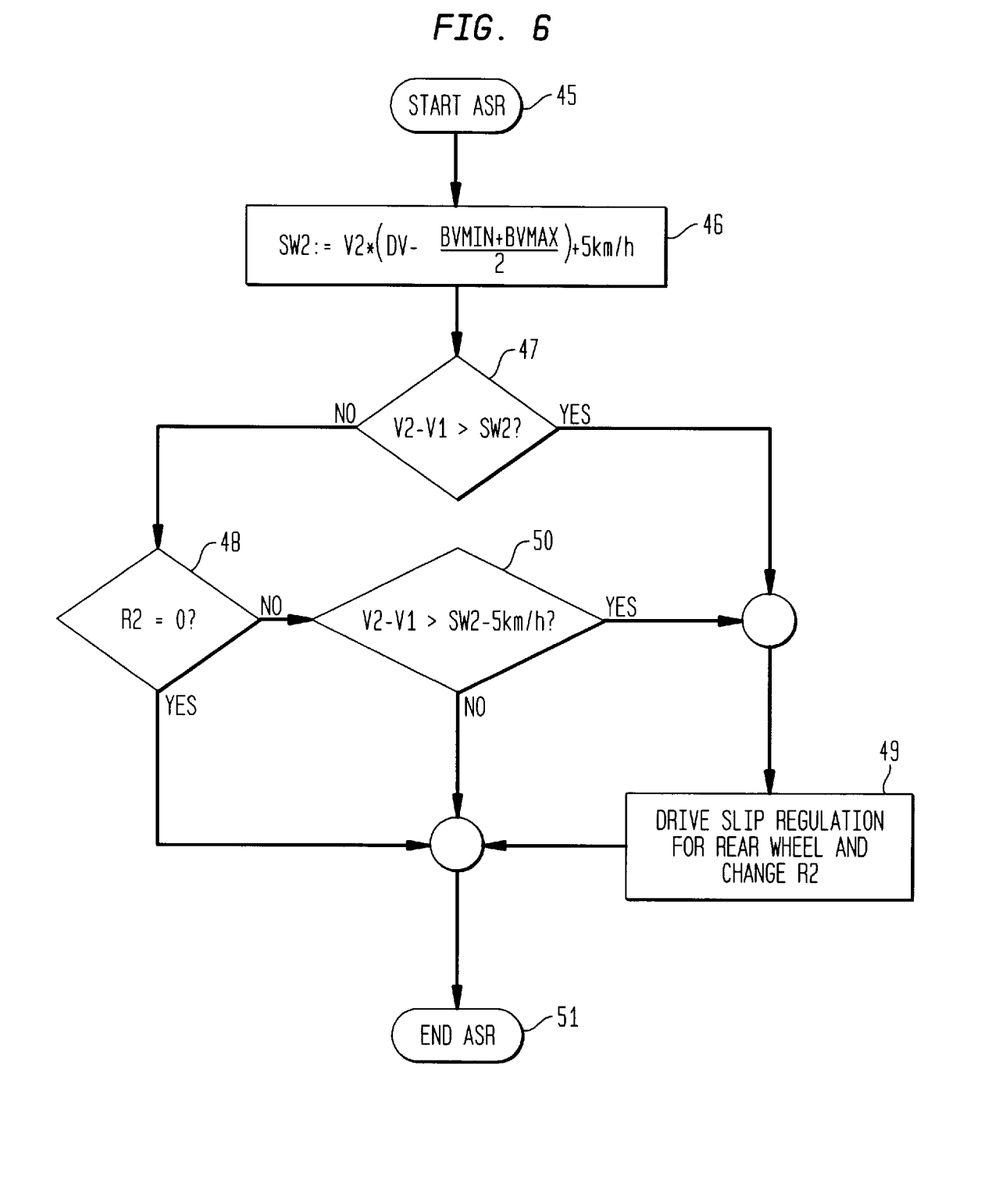

In an analogous manner as in FIG. 5, FIG. 6 shows a program segment for drive slip regulation. Here also only the program steps relating to the invention are described in detail and the control method for drive slip regulation which is realized in a known manner is not discussed in greater detail. In this example, a drive slip regulation, for the driven wheel (5) is assumed.

The program segment starts in FIG. 6 with a block (45).

In the same manner as in block (39) of FIG. 4, a threshold value (SW2) is computed in the process block (46). The threshold values (SW1, SW2) can therefore be determined also in a different manner.

In a decision block (47), a verification is then made to ascertain whether the rotational velocity signal (V2) of the driven wheel (5) falls short of the rotational velocity signal (V1) of the non-driven wheel (6) to a greater degree than indicated by the threshold value (SW2). If this is the case a drive slip regulation is necessary to maintain travel safety or to achieve a start-up acceleration. This drive slip regulation is carried out in the sub-program block (49) and is not explained in further detail here. If the control output value (R2) is to reach its initial value zero again within the framework of the drive slip regulation, the drive slip regulation ends.

However, when the threshold value (SW2) is not exceeded in the decision block (47), a verification is carried out in decision block (48) whether a drive slip regulation has already been started (R2≠0) or not (R2=0). In the latter case, a verification similar to the one in the decision block (47) is carried out in the decision block (50), but with a reduced threshold value. When this reduced threshold value is exceeded, the program also continues with block (49). By using a reduced threshold value, an already started drive slip regulation is not ended directly again in the decision block (47) when the threshold value (SW2) is not attained. The different threshold values in the blocks (47, 50) thus represent a kind of hysteresis.

Blocks (48, 49, 50) all terminate in block (51), where this program segment ends.

A suitable function for error recognition according to block (16) is preferably found in a program step in which the dominant value (DV) as well as the frequency value (FV) is compared with its respectively associated comparison values. If this comparison value is exceeded, the error signal (E) is set to a value by means of which the error display device (7) is actuated and by means of which the driver of the vehicle is informed of the error condition. It is also possible to tie the dominant value (DV) through calculation to the frequency value (FV) in order to produce the error signal (E). By this it is possible, for instance, to signal an error relatively late, i.e., when the frequency value (FV) has attained a high value, in case of a relatively low value of the dominant value which would indicate a minor implausibility of the slip signal (S). In the opposite case of a very implausible signal behavior, it is possible to display the error already while the frequency value (FV) is lower, and thus the driver can be warned earlier.

In another embodiment, the process according to the invention can be used in the automatic control system of a sailboat. The utilization of such control systems for automatic steering, or maintenance of a predetermined course of a sailboat on the high seas is known. Especially with one-hand sailboats, where the crew consists of only one person, such a steering system is necessary for safety reasons.

Such a steering system comprises normally a compass unit which transmits a direction-of-travel signal to an electronic control device which in turn transmits a control signal to a device for the adjustment of the rudder position of the sailboat. The adjusting device may be in the form of an electrical servo-motor. In addition, the steering system is provided with a list measuring device which transmits a signal representing the listing of the sailboat to the electronic control unit. Since undesirably strong listing of the sailboat and therefore a dangerous travel condition may occur in case of strong gales when only the signal of the compass unit is taken into account to maintain a predetermined direction of travel, the additional listing signal is evaluated in the steering system in such manner that when a threshold is exceeded, such a control signal is transmitted to the adjusting device for the position of the rudder that it results in a windward drift correction of the sailboat. As a result, the wind pressure in the sail and thereby also the listing of the sailboat is reduced. After a corresponding non-attainment of the threshold value, another control signal can serve to re-establish the desired direction of travel of the sailboat.

In case of one-sided loading of the sailboat, or of uneven distribution of the crew, in particular on small sailboats, the sailboat lists to a certain degree even without the influence of wind, so that the list measuring device transmits a signal which under certain circumstances already exceeds the threshold value through which the corresponding control steps are actuated in the steering system which lead to a rudder adjustment for the purpose of windward directional correction. This is of course undesirable. By applying the method according to the invention, such erroneous actuation can be avoided. In this case, the first signal as derived from experience with the listing signal is used and by carrying out the method according to the invention in the steering system, the listing signal value caused by one-sided loading is determined to be a dominant value. The control steps associated with the first signal are then the measures carried out in the steering system to produce a control signal for the adjustment of the rudder for the purpose of windward directional correction.

The above described embodiments of the invention are intended to be illustrative only. Numerous alternative embodiments may be devised by those skilled in the art without departing from the spirit and scope of the following claims.

What is claimed is:

1. A method for signal processing carried out in a vehicle control system, comprising the steps of:
    (a) determining the values of at least one first signal (S), which has a face value at any point in time, whereby the values change in time,
    (b) locating the values of the first signal (S) within as well as outside a basic value range (BVMIN, BVMAX) determined for the first signal (S),
    (c) determining a value of the first signal (S) appearing with relative frequency as a dominant value (DV),
    (d) determining a frequency value (FV) which indicates the frequency of the occurrence of the values in the proximity of the dominant value (DV) of the first signal (S),
    (e) carrying out control steps as a function of the occurrence of certain values of the first signal (S) outside the basic value range (BVMIN, BVMAX) and taking into account the dominant value (DV) and the frequency value (FV), in such manner that the carrying out of the control steps depends on the magnitude of deviation of the dominant value (DV) from the basic value range (BVMIN, BVMAX) when the frequency value (FV) reaches at least a predetermined magnitude, wherein:
    (f) in order to evaluate the first signal (S), time segments which follow each other in time are determined,
    (g) a time segment may either run its course normally or be terminated early,
    (h) the value of the first signal (S) which occurs first in a time segment is used as a comparison value (CV) for this time segment,
    (i) a value range which surrounds the comparison value (CV) is selected as a comparison value range, and
    (j) wherein at the occurrence of values of the first signal (S) outside the comparison value range, a time segment is terminated early, and wherein,
    (k) only comparison values (CV) found in normally ended time segments are taken into consideration,
    (l) a first comparison value taken into consideration is used as a preferred value (PV),
    (m) a value range which surrounds the preferred value (PV) is selected as the preferred value range
    (n) wherein the frequency value (FV) is derived from a number of further comparison values (CV) taken into consideration and which are within the preferred value range, and
    (o) wherein the dominant value (DV) is identical with the preferred value (PV).

2. The method according to claim 1, wherein:
    the first signal (S) is used in a closed loop control environment; and the first signal (S) is influenced by carrying out the control steps triggered by the certain values of the first signal (S) outside the basic value range (BVMIN, BVMAX).

3. The method according to claim 1, wherein:
    signals are provided as internal status data (R1, R2); and the applicable preferred value (PV) is accepted as the dominant value (DV) at the occurrence of certain combinations of the frequency value (FV) and the internal status data (R1, R2).

4. The method according to claim 1, wherein the comparison value range has the same magnitude (−ACV, +ACV) as the preferred value range.

5. The method according to claim 1, further comprising the steps of:
    (a) automatically increasing the frequency value (FV) at the occurrence of comparison values (CV) taken into consideration which are located within the preferred value range; and
    (b) automatically reducing the frequency value (FV) at the occurrence of comparison values (CV) taken into consideration which are located outside the preferred value range.

6. The method according to claim 5, wherein:
    a counter whose count represents the frequency value is used to determine the frequency value (FV); and
    the count is increased after a normally ended time segment if the comparison value (CV) lies within the preferred value range, the count is decreased after a normally ended time segment if the comparison value (CV) lies outside the preferred value range, and otherwise the count is maintained.

7. The method according to claim 1, wherein the preferred value (PV) is determined in a time segment in which the frequency value (FV) has at least approximately the value zero.

8. The method according to claim 1, wherein the basic value range (BVMIN, BVMAX) comprises values with positive or negative signs, the amount of which is small by comparison with the overall value range of the first signal (S).

9. The method as in claim 1, wherein the control steps associated with the certain values of the first signal (S) are carried out when the first signal (S) exceeds a threshold value or falls short of it.

10. The method as in claim 9, wherein the threshold value is increased or decreased to a greater degree, depending on the extent to which the dominant value (DV) deviates from the basic value range (BVMIN, BVMAX).

11. The method according to claim 1, wherein the first signal (S) represents the difference between a second signal (V1) and a third signal (V2).

12. The method according to claim 11, wherein the second signal (V1) and the third signal (V2) are rotational velocity signals of a wheel, velocity signals of a vehicle, or reference velocity signals (VREF).

13. The method according to claim 1, wherein the first signal (S) is determined as a quotient of a second signal (V1) and a third signal (V2).

14. The method according to claim 1, wherein the first signal (S) is a slip signal.

15. The method according to claim 1, wherein the control steps which are carried out are for preventing of locking of the wheels of a motor vehicle, for drive slip regulation of at least one drive axle of the motor vehicle, or for the recognition and display of errors.

16. The method according to claim 15, wherein signals are provided as internal status data (R1, R2) which indicate actuation of an anti-lock brake system or a drive slip regulation system.

* * * * *